June 9, 1936. A. T. KOPPE 2,043,802
PHOTO COMPOSING MACHINE
Filed March 7, 1933 7 Sheets-Sheet 1

INVENTOR
Alexander T. Koppe
Ward, Crosby & Neal
ATTORNEYS

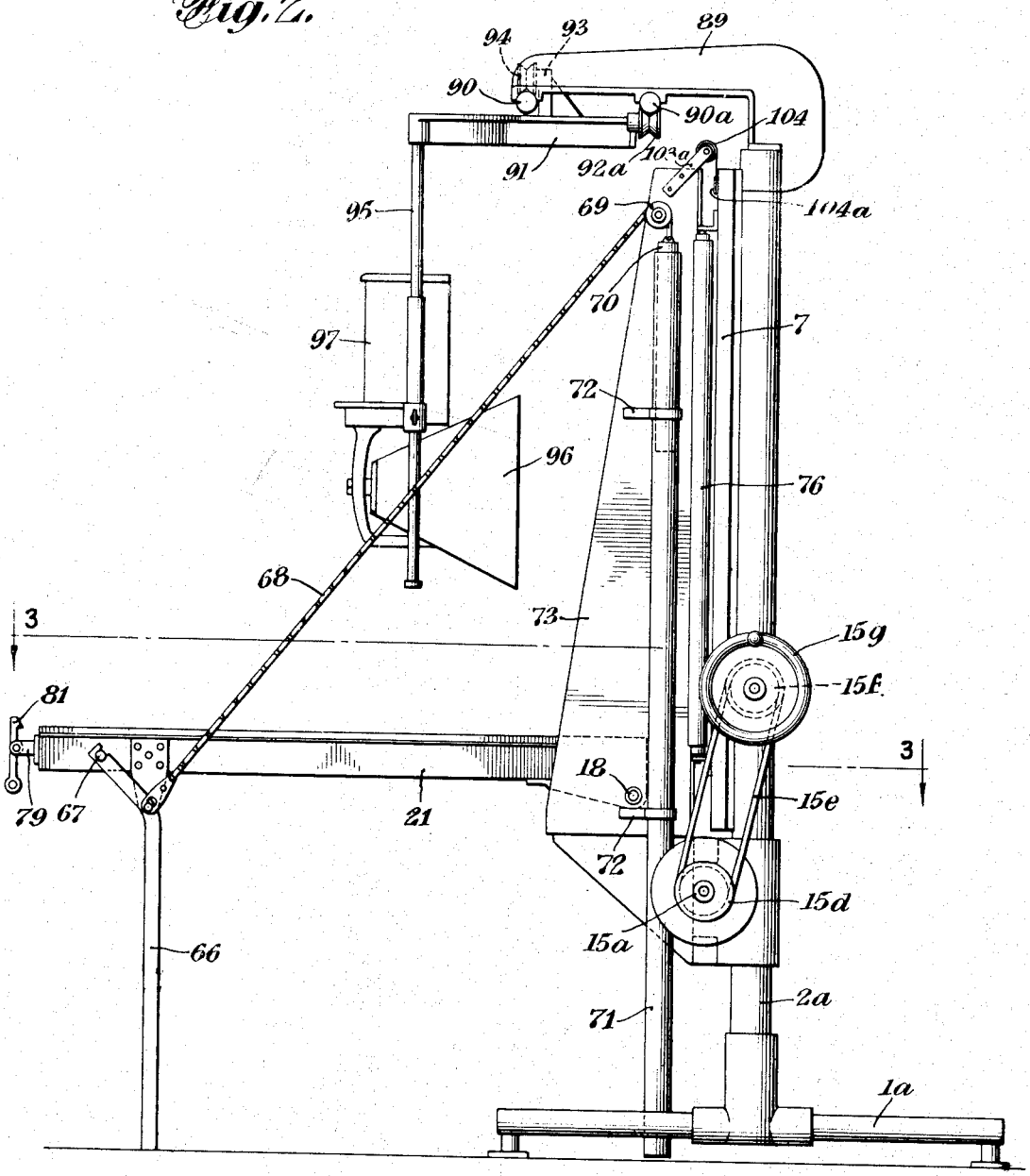

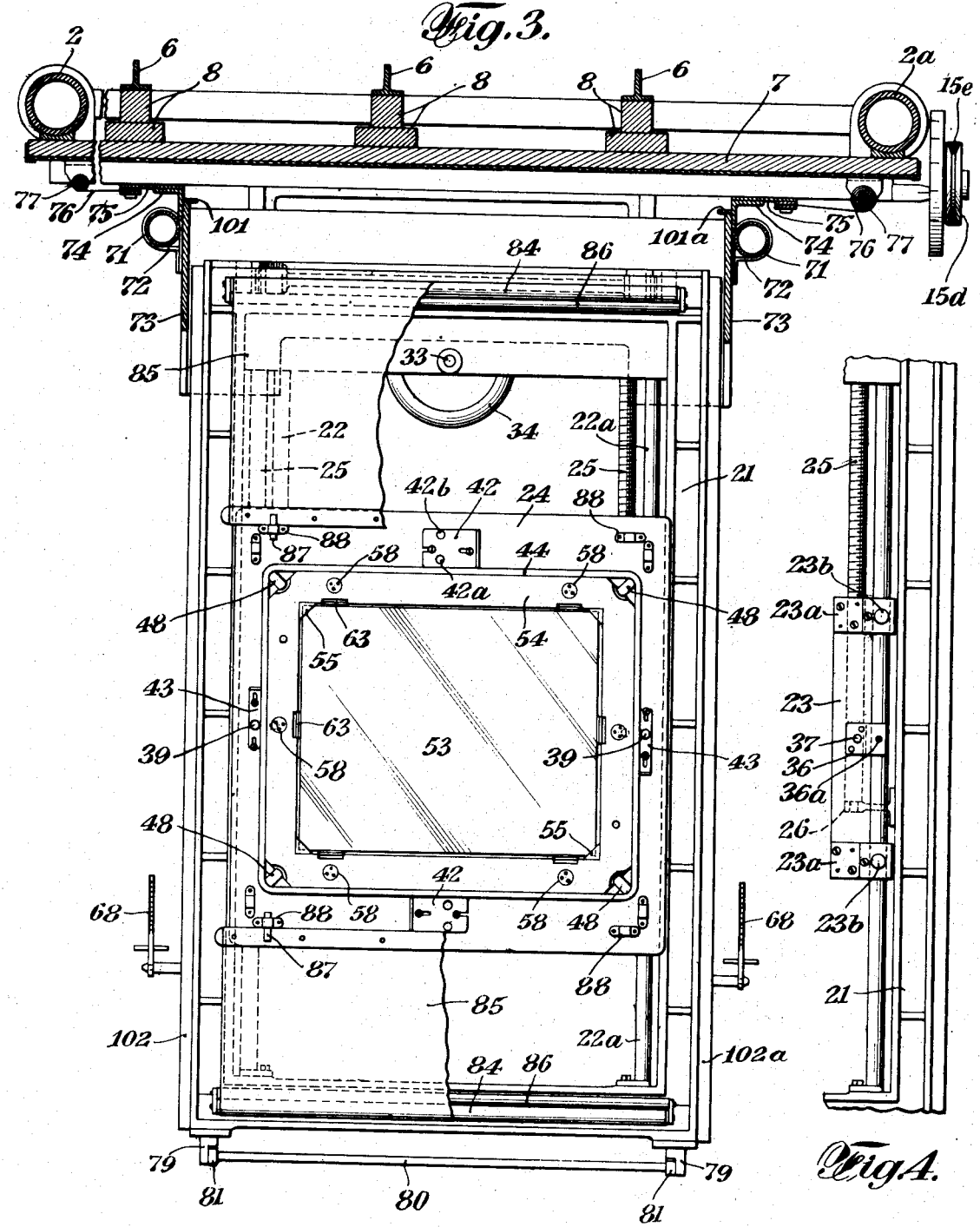

June 9, 1936.   A. T. KOPPE   2,043,802
PHOTO COMPOSING MACHINE
Filed March 7, 1933   7 Sheets-Sheet 4

INVENTOR
Alexander T. Koppe
Ward, Crosby & Neal
ATTORNEYS

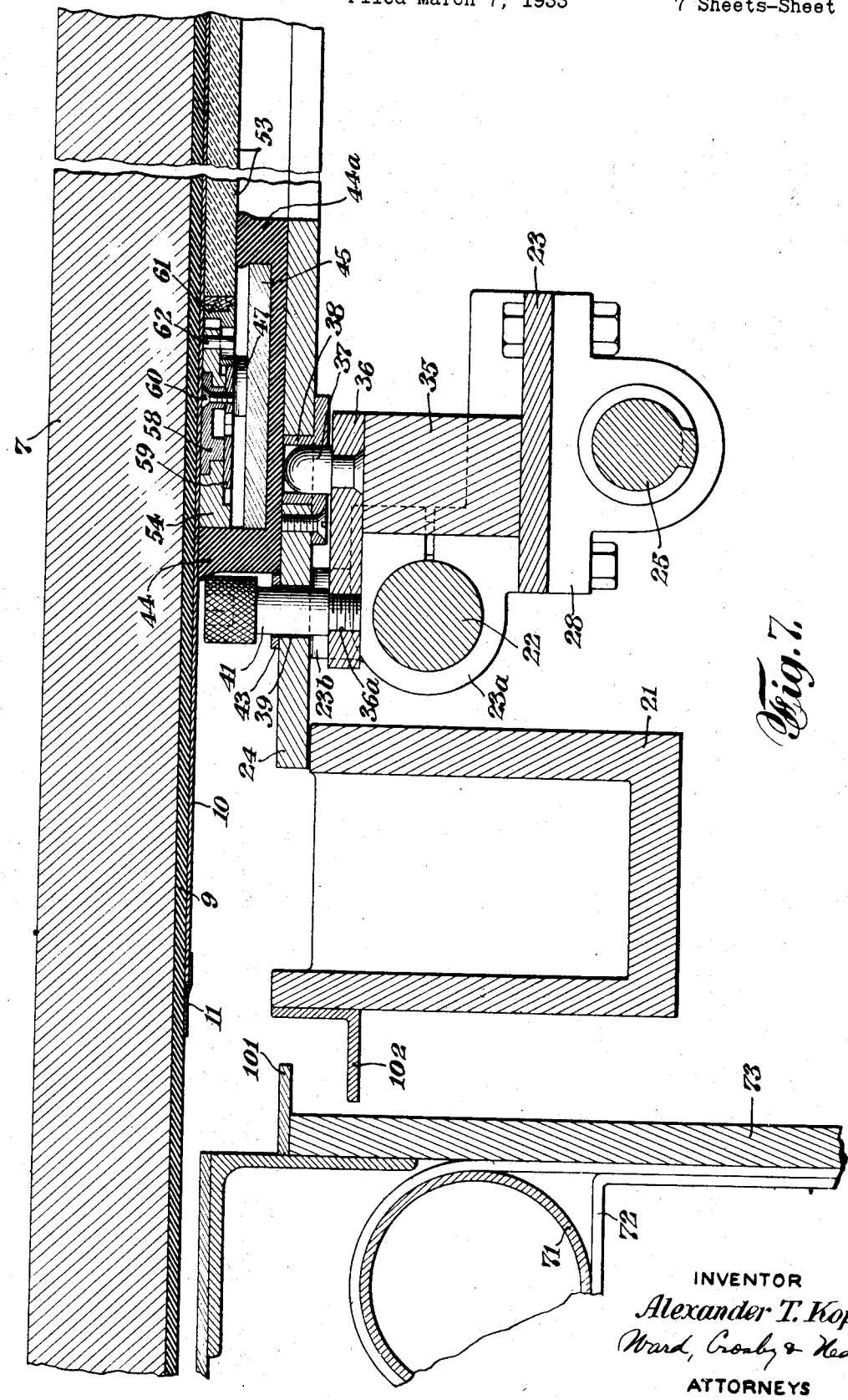

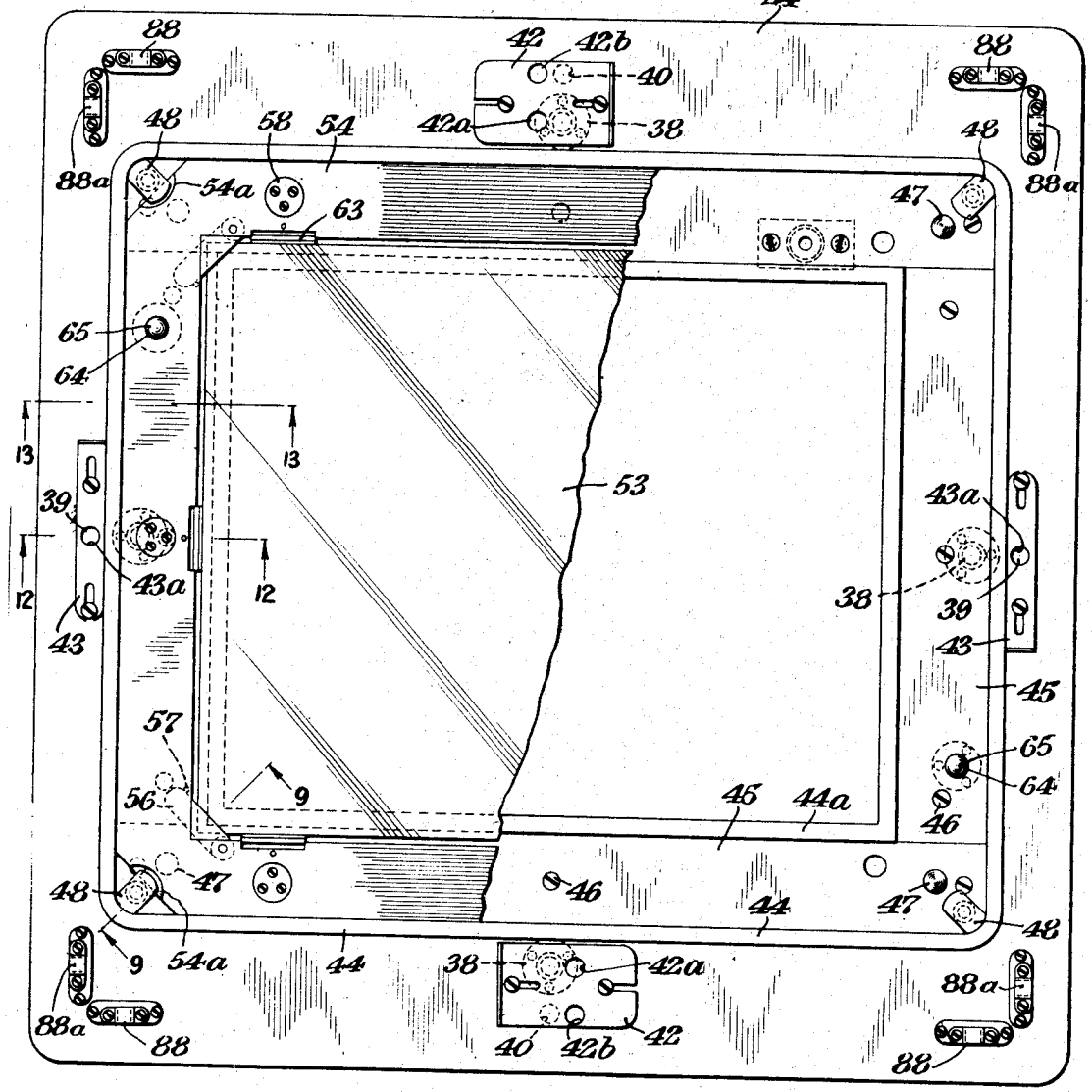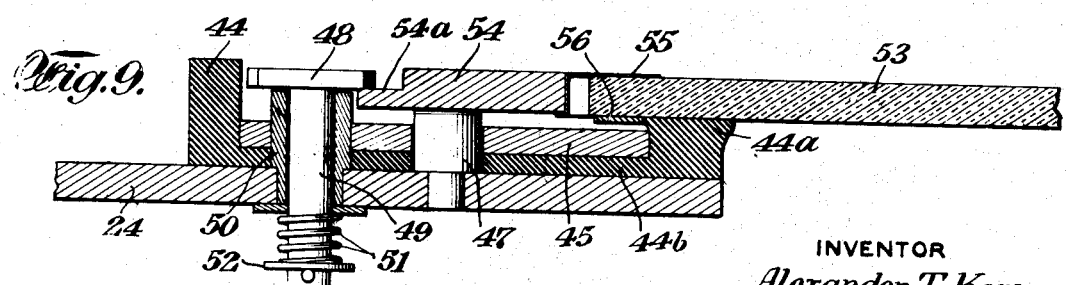

June 9, 1936.　　　　A. T. KOPPE　　　　2,043,802

PHOTO COMPOSING MACHINE

Filed March 7, 1933　　　　7 Sheets-Sheet 7

INVENTOR
Alexander T. Koppe
Ward, Crosby & Neal
ATTORNEYS

Patented June 9, 1936

2,043,802

UNITED STATES PATENT OFFICE 2,043,802

PHOTO COMPOSING MACHINE

Alexander T. Koppe, Passaic, N. J., assignor to General Printing Ink Corporation, New York, N. Y., a corporation of Delaware Application March 7, 1933, Serial No. 659,911

16 Claims. (Cl. 95—76)

My invention relates to a photo-composing machine utilizable for producing a plurality of properly spaced representations on a suitable light-sensitive surface.

My invention has particular reference to a machine of the character stated wherein a vertical frame carrying the light-sensitive surface forms or carries a horizontal track structure along which is movable a main frame having a vacuum frame vertically adjustable therein.

My invention also relates to a vacuum frame of novel and useful character.

Various other advantages, characteristics and features of my invention will become apparent from the following detailed description taken in connection with the accompanying drawings.

For an understanding of my invention and for an illustration of one of the forms thereof, reference is to be had to the accompanying drawings, in which:

Fig. 2 is a side elevational view of the machine shown in Fig. 1 with some of the parts in different positions;

Fig. 3 is a transverse horizontal sectional view, partly in elevation, and is taken on the line 3—3 of Fig. 2 looking in the direction of the arrows;

Fig. 4 is a plan view of a part of the novel mechanism;

Fig. 7 is an enlarged transverse horizontal sectional view, partly in plan, and is taken on the line 7—7 of Fig. 1 looking in the direction of the arrows;

Fig. 8 is a plan view of a vacuum frame assembly;

Fig. 9 is an enlarged vertical sectional view taken on the line 9—9 of Fig. 8 looking in the direction of the arrows;

Figure 1:
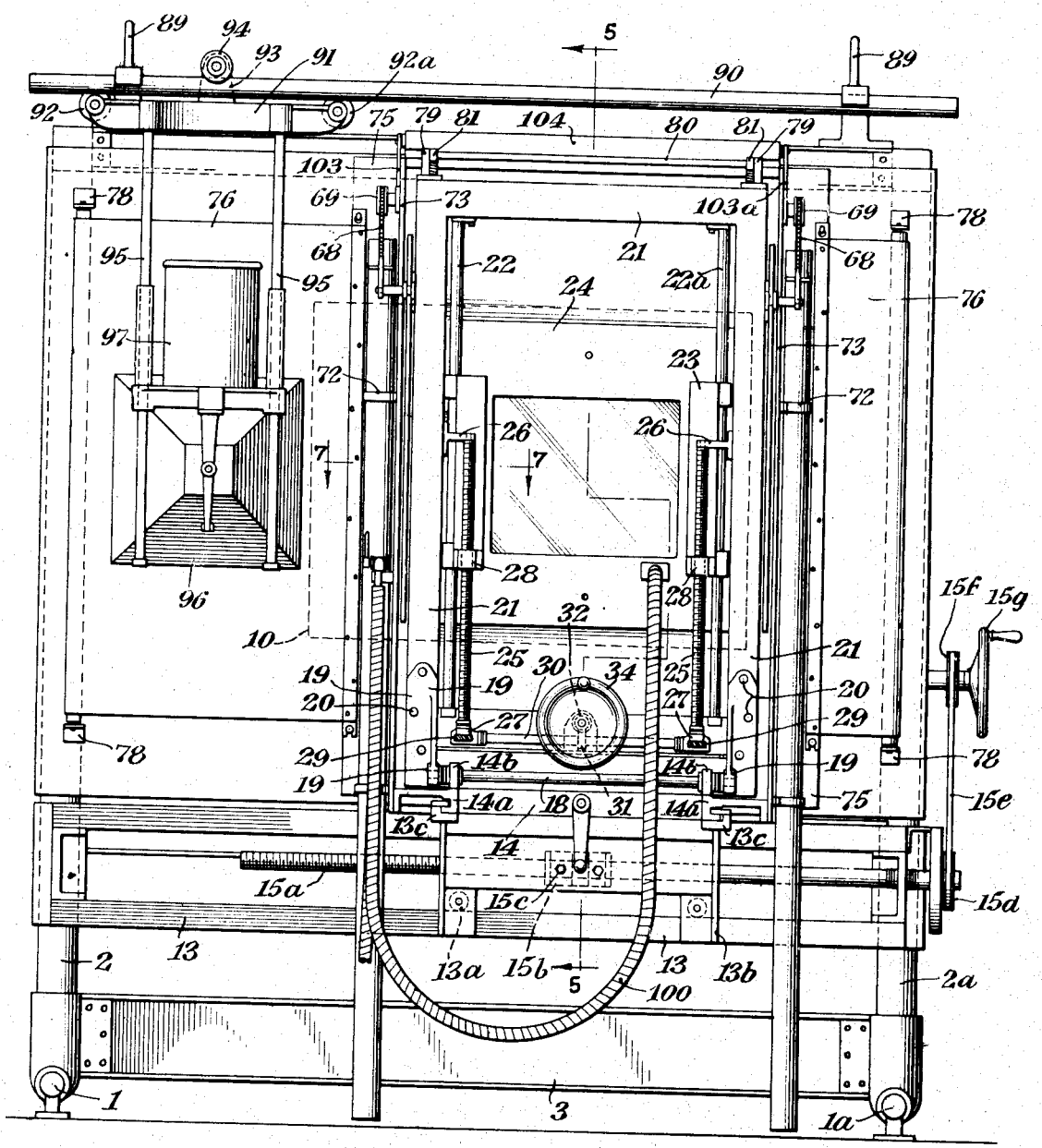
Figure 1 is a front elevational view of a photo-composing machine as constructed in accordance with my invention.

As shown on the drawings, the machine comprises spaced members 1, 1a adapted to rest upon any suitable supporting surface. Extending upwardly from the members 1, 1a are the respective standards 2, 2a which are tied or connected together by lower, intermediate and upper horizontally disposed channel members 3, 4 and 5, or equivalent, Figs. 1 and 5.

Extending vertically and suitably secured in spaced relation to the channel members 4 and 5 are T-bars 6, or equivalent, between which and a vertical base board 7 the reinforcing cleats or members 8 are disposed, Fig. 3. As shown, the base board 7 is suitably secured to the standards 2, 2a in such manner that the bars 6 and cleats 8 serve to reinforce said base board 7 and maintain it rigid and non-yielding.

The base board 7 may be and preferably is formed of wood. The face thereof, opposite the cleats 8, has a rubber blanket 9 or the like permanently secured thereto in any suitable manner, as by a coating of shellac. A light-sensitive element or surface 10, which preferably is a zinc or aluminum plate, is secured to the outer surface of the rubber blanket 9 in any suitable manner, as by the tape strips 11.

A pair of spaced parallel bars 12, 12a extend horizontally between the standards 2, 2a and are secured thereto in any suitable manner. These bars serve as guide tracks for a carriage 13 which carries a plurality of anti-friction rollers 13a coactable with the aforesaid bars. The carriage 13 is provided with a longitudinal passage through which freely extends a threaded rod 15a which coacts with an internally threaded nut member 15b suitably secured to said carriage 13, as by bolts 15c.

Obviously, with an arrangement of the character described, rotation of the rod 15a causes the carriage 13 to move horizontally along the bars 12, 12a, the direction of movement of said carriage 13 being dependent upon the direction of rotation of said rod 15a. For thus rotating the rod 15a, an arrangement of any suitable character may be utilized. As herein shown, the rod 15, at its end adjacent the standard 2a, carries a pulley 15d which is driven by an endless belt 15e driven, in turn, by a pulley 15f operated by a hand wheel 15g, it being understood, however, that any other equivalent arrangement may be utilized.

The aforesaid carriage 13, at opposite sides thereof, comprises vertical web sections 13b which form the respective horizontal track sections 13c. Slidable on these track sections are the respective flange members 14a of a second carriage 14. The carriage 14 carries a fixed nut 14' with which coacts a threaded rod 16 anchored for rotatable movement only in an apertured lug 13c upstanding from the casting 13, said rod 16 being rotated by a handle 17, Fig. 5.

Figure 5:
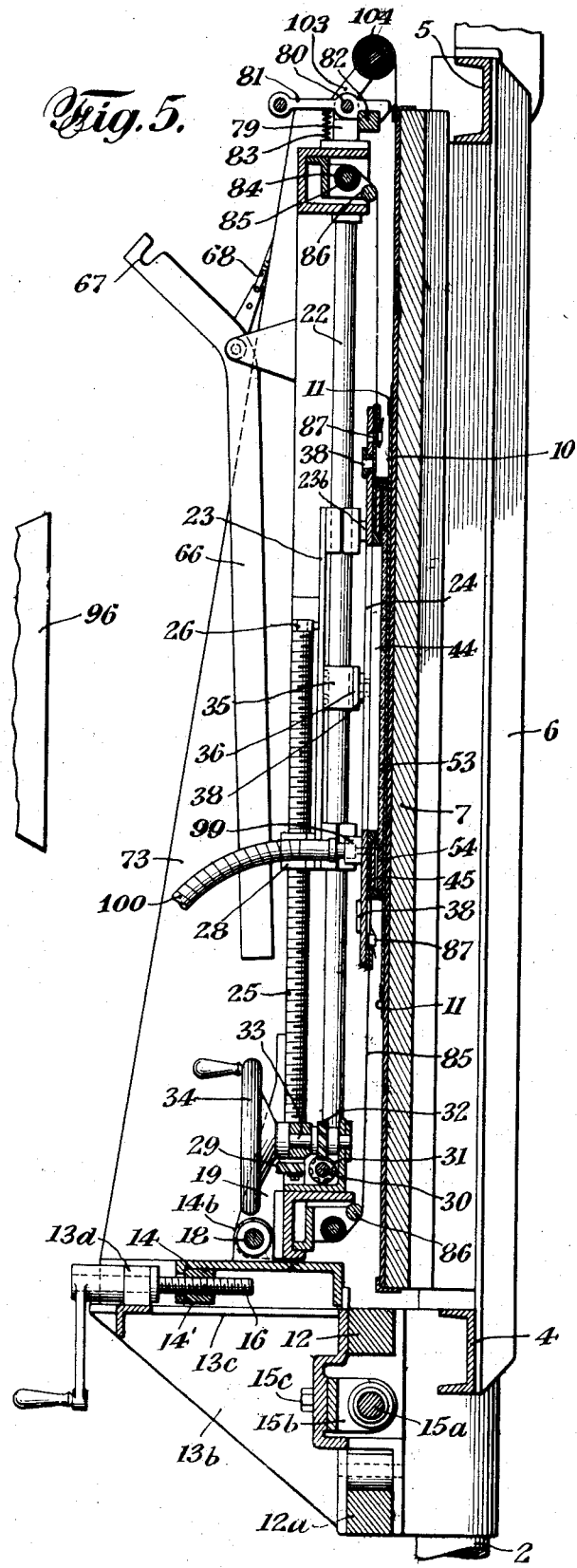
Fig. 5 is a transverse vertical sectional view, partly in elevation, and is taken on the line 5—5 of Fig. 1 looking in the direction of the arrows.

Upstanding from the carriage 14 are a pair of bearing brackets 14b in which a rod 18 is loosely supported. Secured to the opposite respective ends of the rod 18 are bracket members 19 secured by screws 20 to a main frame 21. As hereinafter described, the main frame 21 may be supported in vertical position as shown in Figs. 1 and 5, or in horizontal position as shown in Fig. 2.

The main frame 21 is of open rectangular configuration. Disposed therewithin at opposite sides thereof, respectively, are a pair of vertical guide rods 22, 22a each of which has a bearing plate 23 slidable thereon. The bearing plates 23, in a manner hereinafter to be described, are adapted to carry a vacuum frame 24 and these bearing plates 23 are slidably connected to the guide rods 22, 22a by the upper and lower bearing sections 23a which are suitably secured to or formed integral with said bearing plates 23.

For adjusting the bearing plates 23 and the thereby-carried vacuum frame 24 to a desired position within the main frame 21, there is provided an arrangement comprising a pair of threaded rods 25 each of which is supported by upper and lower brackets 26, 27 carried by the main frame 21. Each of the plates 23 carries a laterally projecting lug 28, Figs. 1 and 7, these lugs 28 being apertured and threaded for the reception of the respective threaded rods 25. Each rod 25, at its lower end, carries a gear 28, the gears 29 meshing, respectively, with gears carried by opposite ends of a shaft 30 extending horizontally and suitably supported by the lower section of the main frame 21. Between its ends, the shaft 30 carries a gear 31 which meshes with a gear 32 carried by a shaft 33 supported in bearing brackets upstanding from said lower section of the main frame 21, the shaft 33 carrying an operating hand wheel 34 or the like.

As clearly appears from a consideration of Fig. 1, rotative movement imparted to the hand wheel 34 effects rotation of the shaft 30 whereby the threaded rods 25 are caused to rotate simultaneously in the same direction. As a result, the bearing plates 23 and the thereby-carried vacuum frame 24 are adjusted to a desired position interiorly of the main frame 21 all as more fully to be hereinafter described.

Referring to Figs. 1, 3, 4 and 7, each of the bearing plates 23 carries a block or lug 35 disposed centrally thereof and having a member 36 secured thereto in any suitable manner. Each member 36 carries a projecting dowel pin 37 and is provided with a threaded passage 36a, Fig. 7, utilizable as hereinafter described. The aforesaid bearing sections 23a of each plate 23 comprise bosses 23b which, as shown in Fig. 7, project beyond the plane of the outer face of the member 36 disposed therebetween.

With the main frame 21 in a horizontal position as shown in Fig. 2, it will be apparent from a consideration of Fig. 4 that the dowel pins 37 project upwardly and that they are in transverse alinement. Further, it will be clear that the bosses 23b likewise project upwardly and that they terminate somewhat above the plane of the upper surface of the members 36 which are in horizontal alinement transversely of the machine.

The aforesaid vacuum frame 24 is of open rectangular configuration and midway along each side thereof is provided with an aperture in which a bushing 38 is received, Figs. 7 and 8. The bushings 38 are so positioned that said vacuum frame 24 may be seated in the main frame 21 with the dowel pins 37 received, respectively, by the bushings 38 on opposite sides of the vacuum frame. When thus positioned, the vacuum frame 24 rests upon the bosses 23b, Fig. 7.

In accordance with the invention, the pairs of bushings 38 on opposite respective sides of the vacuum frame 24 are symmetrically related so that an operator may lift said vacuum frame 24 from the main frame 21 and turn it while maintained substantially horizontal, through an angle of 90 degrees from the position shown in Fig. 3 whereupon the former upper and lower bushings 38 are readily registrable with the respective dowel pins 37.

Referring particularly to Figs. 3, 4, 7 and 8, the vacuum frame 24 is shown as provided with pairs of passages 39 and 40, the former being in horizontal alinement and the latter in vertical alinement. The passages 39 are provided so that, with the vacuum frame 24 in the position shown on the drawings, a member 41 may be passed through each passage 39, the members 41 being threaded into the adjacent passages 36a, respectively, of the respective plates 36, Fig. 7. The passages 40 are utilized when the vacuum frame 24 is in the position described above after it has been turned through an angle of 90 degrees from the position shown in Fig. 3. When in this position, a member 41 may be passed through each passage 40 and threaded into the passage 36a of the adjacent plate 36. This arrangement is provided so that the vacuum frame 24 may be securely retained in position interiorly of the main frame 21 when the latter is moved from horizontal to vertical position about the axis of rod 18.

Referring particularly to Fig. 8, a pair of members 42 are shown as slidably mounted to limited extent on the respective upper and lower sections of the vacuum frame 24. Each of these members 42 is provided with a pair of vertically alined passages 42a and 42b, the passages 42a being adapted for alinement with the passages defined by the respective bushings 38 at the top and bottom of said vacuum frame 24, and the passages 42b being adapted for alinement with the respective passages 40. In addition to the function just described, the members 42 are movable to the position shown in Fig. 8 wherein they cover the passages of the respective bushings 38 and the passages 40.

At the respective sides of the vacuum frame 24, members 43 are mounted thereon for limited slidable movement the same as the aforesaid members 42. Each member 43 is provided with a passage 43a which, as shown, may be alined with a passage 39, the members 43, however, being slidable to such position that the respective pairs of passages 43a, 39 are out of alinement with each other.

The slidable members 42 and 43 are constructed from material suitably resistant to the passage of light. They function in a manner hereinafter to be described to prevent passage of light through those passages in the vacuum frame 24 which are not in use for a particular position of that frame. This feature of the invention will be subsequently described.

Upstanding from the vacuum frame 24, when the latter is positioned horizontally as shown in Fig. 3, are a pair of sealing strips or members 44, 44a which preferably are integrally formed with a base section 44b resting upon said vacuum frame 24. As illustrated, the sealing members 44 and 44a are of generally rectangular configuration, the latter being disposed within the former, and the members 44, 44a and 44b are formed, preferably, from one integral piece of suitable flexible material such as rubber, leather or the like.

The aforesaid vacuum channel arrangement, which is formed from the sealing members 44, 44a and the base section 44b, is maintained in position on the vacuum frame 24 by metallic plates 45 which overlie the base section 44b and are secured in position by screws 46 which pass through said plates 45 and the base section 44b.

Secured to the vacuum frame 24 and projecting upwardly at each corner of the aforesaid vacuum channel arrangement are the respective stop members 47, each of which extends through a plate 45, the underlying base section 44b and is fastened to the vacuum frame 24.

Disposed adjacent each of the stop members 47 and in each of the four corners formed by the outer sealing member 44 is a latch plate 48 having a shank 49 loosely mounted in a bushing 50 upstanding from the vacuum frame 24, said bushing 50 extending through the base section 44b and the overlying plate 45. Below the vacuum frame 24, the shank 49 carries a coiled spring 51 maintained under compression between the bottom of the bushing 50 and a disk 52 carried by said shank 49.

In accordance with usual practice, there is utilized a glass plate 53, or equivalent, which has suitably associated therewith any desired positive or negative, a representation of which is to be formed on the light-sensitive surface 10, such positive or negative being hereinafter generically referred to in this specification and in the claims as a "negative". With the negative on the glass plate 53, the latter is disposed within an open rectangular frame or chase 54 which, in accordance with my invention, is of novel construction.

Figure 10:
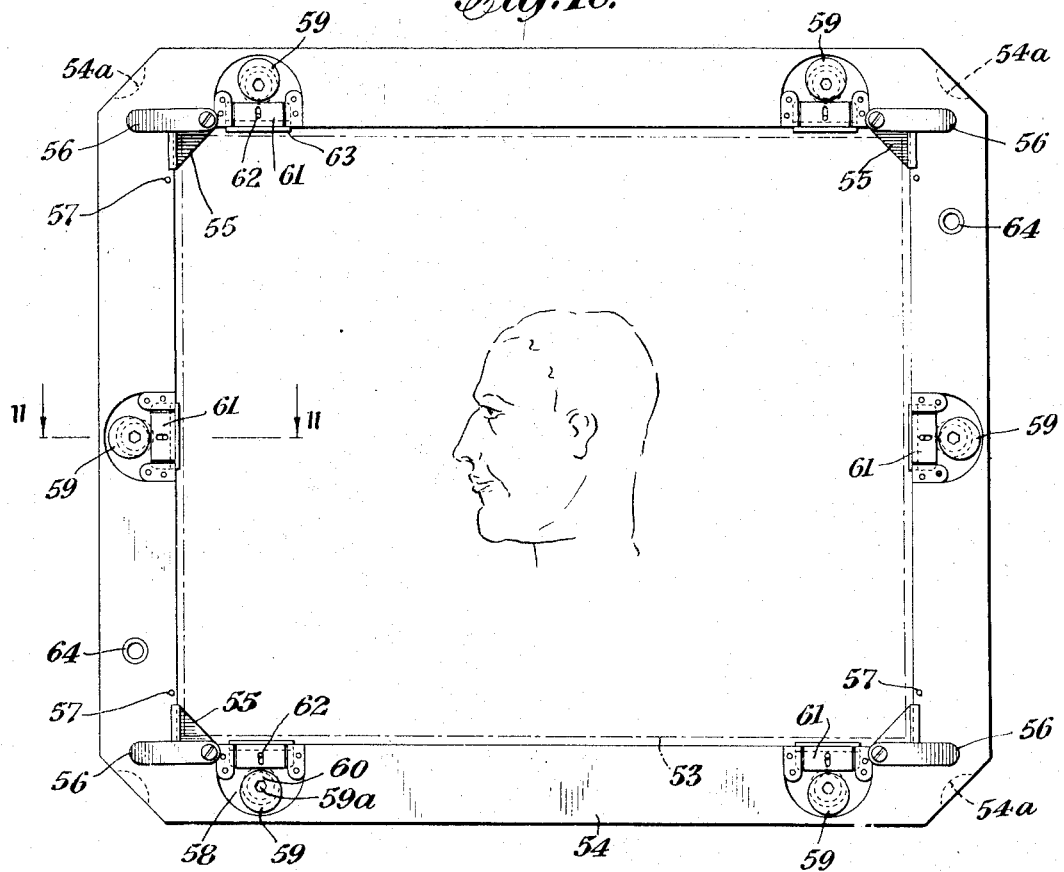
Fig. 10 is a plan view of a chase assembly.

As shown in Figs. 9 and 10, the chase 54, at each of its corners, is provided with a fixed support 55 upon which the respective corners of the glass plate 53 are adapted to rest. A latch 56 is pivoted at each chase corner and each latch may be positioned as shown in Fig. 8 in engagement with a stop member 57. Accordingly, after the glass plate 53 has been suitably located within the chase 54 while resting upon the corner supports 55, the latches 56 may be moved into engagement with the opposite corner surfaces of said plate 53 whereby the latter is securely retained in the chase.

Figure 11:
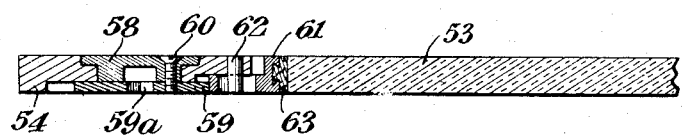
Fig. 11 is an enlarged vertical sectional view taken on the line 11—11 of Fig. 10 looking in the direction of the arrows.
Figure 12:
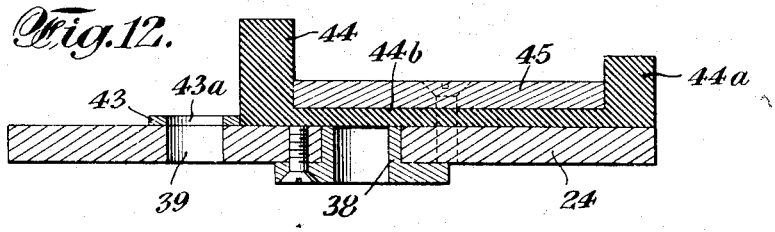
Fig. 12 is an enlarged vertical sectional view taken on the line 12—12 of Fig. 8 looking in the direction of the arrows.
Figure 13:
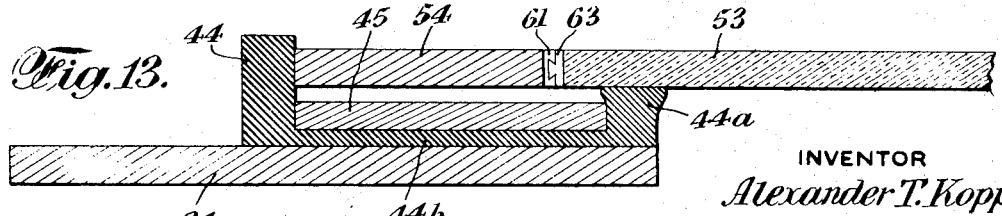
Fig. 13 is an enlarged vertical sectional view taken on the line 13—13 of Fig. 8 looking in the direction of the arrows.

The chase 54 carries a plurality of similar devices or units for adjusting the position of the plate 53 interiorly thereof. As herein shown, each of these devices or units comprises a member 58 suitably secured in an opening in the chase 54, Fig. 11. The member 58 forms a support for a cam plate 59 mounted for oscillatory movement on a pin 60 journalled in said member 58. The cam plate 59 coacts with a member 61 slidably mounted in a cut-away portion of the chase 54, said member 61 having a slot connection with a pin 62 carried by the chase. The member 61 has secured thereto a member 63 of leather, or equivalent, which is adapted to coact with the edge of the glass plate 53.

As clearly shown in Fig. 10, a pair of the above described adjusting units are disposed in suitable spaced relation in the top and bottom sections of the chase 54, and a single adjusting unit is disposed in each side of said chase 54 midway between the ends thereof.

As illustrated in Fig. 10, each side of the chase 54 is provided with a passage which is defined by a bushing 64. These bushings should be symmetrically located in the sense that the bushing 64 at the left of Fig. 10 is the same distance below the center line of the chase as the bushing 64 at the right of said Fig. 10 is above said center line.

In order to locate the glass plate 53 within the chase 54, the latter is placed upon a suitable registering device, not shown, which preferably has upwardly projecting dowel pins to be received in the respective bushings 64. With the chase 54 thus positioned on the registering device, the corner supports 55 are disposed downwardly, and the glass plate 53 is laid upon these supports with the negative facing downwardly. The cam plates 59 of the various adjusting units are now manipulated, as by operation of a socket wrench received in the plate sockets 59a, to adjust the position of said plate 53 within the chase 54 for the purpose of properly locating the negative with respect to the registering device. When this has been completed, the latches 56 may be positioned over the respective glass plate corners whereby said glass plate is positively locked in the chase in its proper located position.

The glass plate and the chase now form a unit which may be removed from the registering device and positioned, with the negative facing upwardly, on the vacuum frame 24 while the latter is disposed in the horizontal position shown in Figs. 2 and 3.

As indicated in Fig. 8, the vacuum frame 24 has a pair of dowel pins 65 projecting upwardly from opposite sides thereof, these dowel pins being seated in said frame and extending through openings provided in the base section 44b of the vacuum channel arrangement and the overlying plate 45. The dowel pins 65 are so positioned on the vacuum frame 24 that the bushings 64 of the chase 54 are registrable, respectively, therewith when said chase is properly placed on the vacuum frame. By virtue of the arrangement just described, the chase may be positioned in predetermined relation on said vacuum frame. Further, as will be obvious from a consideration of Fig. 8, the chase, after release of the latches 56, may be lifted from the vacuum frame 24, while the latter is horizontally disposed, and turned through an angle of 180 degrees while maintained substantially horizontal. Thereupon, the chase may be redeposited in reverse position on the vacuum frame, this result being obtainable due to the fact that the spacing between the bushings 64 and the dowel pins 65 is selected with this end in view.

It will be noted that the corners of the chase 54 are angled as indicated and that these corner sections are cut away to form the respective ledge sections 54a. It is with these ledge sections that the hereinbefore described latch plates 48 are coactable as shown in Figs. 8 and 9 for holding the chase firmly in position on the vacuum frame.

As shown in Fig. 9, the chase 54 is held, by the latch members 48, in engagement with the hereinbefore described stop members 47, the glass plate 53 being held in engagement with the sealing member 44a. The force exerted by the latch members 48, under the influence of the springs 51, is considerable and, therefore, the sealing member 44a is compressed as indicated whereby an air-tight seal is formed between said sealing member 44a and the glass plate 53.

In Fig. 2, the main frame 21 is shown in its horizontal position. When thus disposed, said main frame is partially supported by a pair of standards 66 pivoted to brackets projecting from said main frame. These standards are adapted to engage the floor surface and they are provided with upper latch sections which coact with the respective stop pins 67 whereby said standards are detachably retained in the vertical position shown in Fig 2.

The main frame 21 together with the parts carried thereby are of considerable weight and, therefore, it is desirable that a counter-balancing arrangement be provided therefor. To this end, a pair of chains 68, or equivalent flexible members, may be provided, these chains being connected, respectively, to the aforesaid brackets and extending over the respective pulleys 69. Below these pulleys, the chains 68 are connected to the respective weights 70 which are suspended for free vertical movement in the tubes 71, respectively. These tubes terminate above the floor surface on which the machine is supported, Fig. 1, and they are secured, respectively, by clamps 72 or the like to vertical uprights 73 which are supported by the respective lateral sections 14c of the casting 14.

Adjacent the base board 7, the uprights 73 have vertical angle irons 74 secured thereto, respectively. To each angle iron 74, a plate 75 is secured and, to each plate, one edge of a curtain 76 is detachably secured in any suitable manner. Each curtain 76 is wound upon a spring-controlled roller 77 which is mounted upon suitable brackets 78 secured to the base board 7.

Upstanding from the main frame 21 are a pair of spaced bearing lugs 79 which loosely support a rod 80 having movable therewith a pair of latching levers 81 which coact with a bar 82 fixed to the upper ends of the aforesaid uprights 73. As shown in Fig. 5, the levers 81 are biased by springs 83 in a clockwise direction whereby they are adapted to remain positively engaged with the bar 82.

As appears from a consideration of Fig. 5, the upper and lower sections of the main frame 21 support the respective spring-controlled rollers 84, each of which carries a curtain 85 adapted to engage an idler roller 86. The free ends of the curtains 85 are adapted for connection to the vacuum frame 24 in any suitable manner and, to this end, said curtains 85 may carry hooks 87 adapted for detachable connection with brackets 88 carried by the horizontal sections of the vacuum frame, Fig. 8. As said vacuum frame is positioned in Fig. 8, the vertical sides thereof carry brackets 88a so that the curtains 85 may be connected thereto when the vacuum is in the position to which it may be turned as hereinbefore described.

Referring now to Figs. 1, 2 and 5, the upper channel member 5 is shown as carrying a pair of spaced arms 89 which comprise horizontal sections carrying a pair of horizontally disposed track members 90, 90a. Freely slidable along these track members is a frame 91 on which a pair of spaced rollers 92, 92a are journalled for engagement with the lower surface of the track member 90a. The frame 91 carries an upstanding bracket 93 which carries a roller 94 for engagement with the upper surface of the track member 90.

Depending from the frame 91 are a pair of spaced rods 95 utilizable for supporting a lamp hood 96 which receives any suitable source of light, not shown, the rods 95 also carrying a housing 97 utilizable for receiving parts of the lamp mechanism.

As clearly appears, the frame 91 is readily translatory horizontally in either direction along the track members 90 and 90a. It follows, therefore, that the hood 96 which is open at the right side, Fig. 2, may readily be moved to a desired position and that the light beam from the aforesaid light source passes from left to right, Fig. 2.

The operation is as follows:

With the main frame 21 horizontally positioned as shown in Fig. 2, it may be assumed that the vacuum frame 24 is disposed and held therein by the members 41 in the manner hereinbefore described. After the operator has properly located and locked a glass plate 53 in the chase 54, the latter is removed from the registering device and disposed in the vacuum frame 24 with the chase resting upon the stop members 47 and the glass plate 53 resting upon the sealing strip 44a, Fig. 9, the chase being held in this position by the latch plates 48 and the negative being on the upper side of said glass plate.

The main frame 21, aided by the counterweight arrangement, may now be swung to vertical position where it is held by engagement of the latch members 81 with the bar 82. When the main frame 21 is thus swung to vertical position, the carriage 14 should be in such retracted position that the outer sealing strip 44 does not come into engagement with the light-sensitive plate 10.

Ordinarily, the operator has at hand a layout of the prints to be formed on the light-sensitive plate and, from this, he determines the area which is to receive the first print. The next step involves positioning of the movable apparatus so that the glass plate 53 comes to such position that the negative thereon is directly opposite the selected area. To this end, the hand wheel 34 may be operated to effect rotation of the threaded rod 25 and impart vertical movement to the vacuum frame 24 within the main frame 21. In this manner, the negative on the glass plate 53 is brought into horizontal alinement with the selected area on the light-sensitive plate 10.

The hand wheel 15g may now be operated to impart translatory movement through the described chain of connections to the carriage 13 whereby it moves horizontally on the bars 12, 12a. The carriage 13 carries the carriage 14, the main frame 21, the vacuum frame 24, the chase 54 and the glass plate 53 and, therefore, by the described movement of the carriage 13, the negative on the glass plate 53 is brought into vertical alinement with and registered opposite the selected area on the light-sensitive plate 10 which is to receive the first print.

Figure 6:
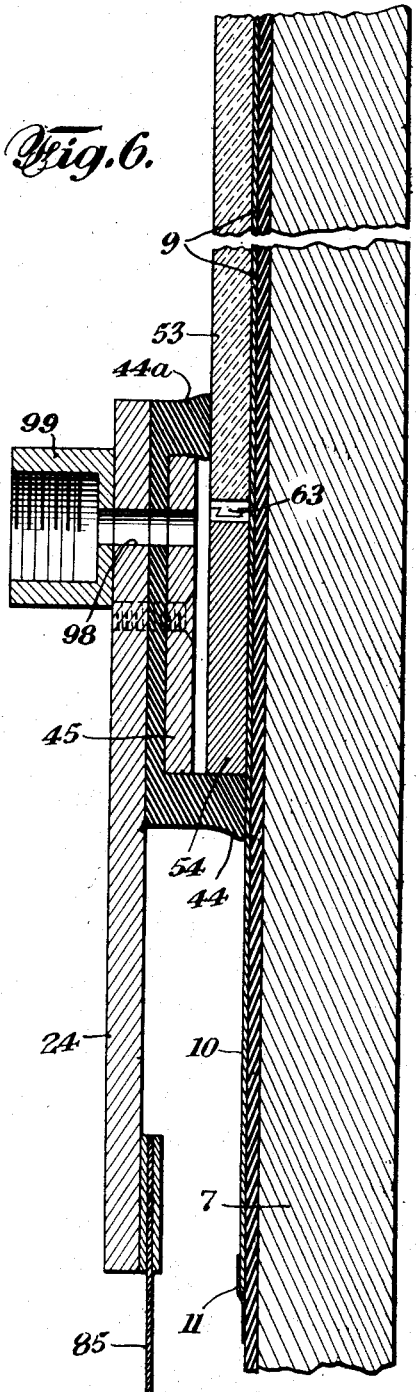
Fig. 6 is an enlarged elevational view showing a feature of the invention.

The operator now manipulates the handle 17 to move the carriage 14 toward the base board 7. By so doing, the outer sealing strip 44 is first brought into engagement with the light-sensitive plate 10 and then the face of the glass plate 53 bearing the negative is contacted directly with said light-sensitive plate 10. When the parts last named are thus directly and firmly engaged with the light-sensitive plate 10, they take a position such as shown in Figs. 5, 6 and 7 wherein the outer sealing strip 44 is under some degree of compression and forms a sealed joint with said light-sensitive plate around the chase 54.

As clearly appears, the vacuum channel arrangement comprising the integral parts 44, 44a and 44b form a sealed chamber closed to the atmosphere by the sealing strip 44 which engages the light-sensitive plate 10 and the sealing strip 44a which engages the glass plate 53. A passage 98, Fig. 6, opens into this chamber and extends through one of the members 45, the base section 44b of the vacuum channel arrangement, and the adjacent section of the vacuum frame 24, said passage 98 communicating with the bore of a cup member 99 secured to said vacuum frame 24. Adapted for detachable sealed connection with the cup member 99 is a hose connection 100, Fig. 5, which leads to any suitable vacuum pump arrangement, not shown.

Accordingly, by way of said hose connection 100, the air may be exhausted from the aforesaid sealed chamber to a desired degree. When this has been accomplished, the glass plate 53 and the adjacent surface of the light-sensitive plate 10 are held in intimate contact with each other by the action of atmospheric pressure.

The lamp hood 96 and the therein-contained source of light are now moved along the track members 90, 90a until opposite the area upon which the print is to be made. The source of light is now energized for a suitable period of time and light passes from left to right, Fig. 5, through the glass plate 53, the negative thereon, and into engagement with the light-sensitive plate 10 whereby a representation of said negative is formed on said plate 10. This completes the printing operation.

The hose connection 100 may now be removed from the cup member 99 to effect equalization of pressures. Operation of the handle 17 causes retraction of the carriage 14 whereupon either the hand wheel 15g or the hand wheel 34 may be operated to position the glass plate 53 in the next printing position. As will clearly appear, operation of the hand wheel 15g effects movement of the carriage 13 to cause the plate 53 to move horizontally from the last printing position while operation of the hand wheel 34 causes said plate 53 to move vertically from its last printing position.

When the glass plate 53 has thus been properly positioned in the next printing position, the operations described above are repeated. That is, the carriage 14 is moved toward the base board 7 to produce a sealed chamber around the chase 54, this chamber is evacuated, the light source is moved into position, and the printing operation then effected.

The foregoing sequence of operations are repeated as often as may be necessary to secure the desired number of prints on the light-sensitive plate 10. When the printing operations have been completed, the light source is moved to one side and the latch members 81 released so that the main frame 21 may be dropped to its horizontal position. The light-sensitive plate 10 is now removed from the base board 7 and treated elsewhere for development purposes in a manner well understood in the art. With a new light-sensitive plate 10 secured to the base board 7, the operations hereinbefore described may be repeated to produce a new series of prints.

As clearly appears from a consideration of Fig. 1, the curtains 76 roll up and unroll, respectively, during horizontal movement of the carriage 13 under the control of the threaded rod 15a. This action occurs because each of said curtains 76 is secured to a member 75 which, as described, is translatory with said carriage 13. Further, as appears from a consideration of Figs. 3 and 5, the curtains 85 roll up and unroll, respectively, during vertical movement of the vacuum frame 24. By virtue of this curtain arrangement, the light-sensitive plate 10 is shielded from light while permitting free movement of the various parts of the mechanism.

As shown in Figs. 3 and 7, members 101, 101a project toward each other from the respective angle irons 74. The main frame 21 also carries a pair of members 102, 102a which project laterally from opposite sides thereof. When the main frame 21 is in vertical position, these pairs of members overlap each other as shown in Fig. 7 and prevent the direct passage of light to the light-sensitive plate through the otherwise open space at opposite sides of the main frame 21.

When the vacuum frame 24 is positioned in the main frame 21 as indicated in Fig. 8, the dowel pins 37 are received, respectively, in the bushings 38 at opposite sides of said vacuum frame. Under such circumstances, the bushings 38 at the top and bottom of the vacuum frame are not in use and, therefore, the plates 42 are positioned as shown in said Fig. 8 to prevent the passage of light through the last named bushings 38 and the adjacent passages 40. Otherwise, light would pass through these openings and produce light spots on the light-sensitive plate 10. When the vacuum frame is to be positioned on the main frame 21 in its alternate position, i. e., after having been turned through an angle of 90 degrees, it will be obvious that the plates 42 are moved to such position that the upper and lower bushings 38 and passages 40 are free and unobstructed. It will be understood, that, in said alternate position of the vacuum frame, the plates 43 have a function corresponding with that above described with respect to the plates 42.

As shown in Figs. 1, 2 and 5, a pair of arms 103, 103a project upwardly from the aforesaid uprights 73, respectively. These arms have journalled therein a spring-controlled roller upon which a curtain 104 is wound. In the event that a light-sensitive plate 10 remains on the base board 7 for any length of time while the main frame 21 is in horizontal position, this curtain is pulled down by its handle section 104a whereby said plate 10 is protected from the action of light thereon.

An important feature of the invention resides in the arrangement for supporting the vacuum frame for movement with respect to the base board 7. The latter is mounted in fixed vertical position and it is necessary to obtain access to the front face thereof for the purpose of securing the light-sensitive plate thereto and removing the same therefrom. I have determined that it is highly advantageous to provide a horizontal track structure on which the vacuum frame is mounted for horizontal movement and this track structure should be to one side of, either above or below, the horizontal center line of the base board. Further, it is desirable for this track structure to take substantially the entire weight of the vacuum frame and the parts supporting the same whereby ready pivotal movement of the vacuum frame may be had all as more particularly pointed out in the appended claims.

Another important feature of the invention involves the vacuum frame per se together with the associated chase assembly. An arrangement of the character described is especially useful with a vertical machine and this is true particularly for the reason that the vacuum frame may be locked to the main frame while the latter is horizontally disposed. The chase, with the negative-bearing plate secured thereto, may thereafter be advantageously secured in the channel of the sealing device comprising the parts 44, 44a and 44b which, as stated, is secured to the vacuum frame.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. In a photo-composing machine, a base board immovably fixed in vertical position and adapted to have a light-sensitive element secured thereto, horizontal guiding means mounted in fixed position entirely at one side of the horizontal center line of said base board, a vacuum frame carried by said fixed guiding means, and means for adjusting said vacuum frame with respect to said light-sensitive element.

2. In a photo-composing machine, a base board immovably fixed in vertical position and adapted to have a light-sensitive element secured thereto, horizontal guiding means mounted in fixed position and positioned entirely at one side of the horizontal center line of said base board, a vertical frame slidable on said fixed guiding means, a vacuum frame carried by said vertical frame, and means for adjusting said vacuum frame in a vertical direction toward and from said fixed guiding means.

3. In a photo-composing machine, a base board immovably fixed in vertical position and adapted to have a light-sensitive element secured thereto, horizontal guiding means mounted in fixed position and positioned immediately adjacent the bottom of said base board, a vertical frame slidable on said fixed guiding means, a vacuum frame carried by said vertical frame, and means for adjusting said vacuum frame in a vertical direction toward and from said fixed guiding means.

4. In a photo-composing machine, a base board immovably fixed in vertical position and adapted to have a light-sensitive element secured thereto, horizontal guiding means mounted in fixed position and positioned entirely at one side of the horizontal center line of said base board, a vertical frame having its weight taken substantially solely by said guiding means, and a vacuum frame carried by said vertical frame.

5. In a photo-composing machine, a base board immovably fixed in vertical position and adapted to have a light-sensitive element secured thereto, horizontal guiding means mounted in fixed position immediately adjacent the bottom of said base board, a vertical frame having its weight taken substantially solely by said guiding means, a vacuum frame carried by said vertical frame, and means for adjusting said vacuum frame in a vertical direction toward and from said fixed guiding means.

6. In a photo-composing machine, a base board immovably fixed in vertical position and adapted to have a light-sensitive element secured thereto, horizontal guiding means mounted in fixed position immediately adjacent the bottom of said base board, a vertical frame slidable on said fixed guiding means, said vertical frame facing said light-sensitive element and being movable toward and from the same, and a vacuum frame carried by said vertical frame.

7. In a photo-composing machine, a base board immovably fixed in vertical position and adapted to have a light-sensitive element secured thereto, horizontal guiding means mounted in fixed position immediately adjacent the bottom of said base board, a vertical frame slidable on said fixed guiding means, said vertical frame facing said light-sensitive element and being movable toward and from the same, means for moving said vertical frame horizontally in a direction parallel to said element, and a vacuum frame carried by said vertical frame.

8. In a photo-composing machine, a base board immovably fixed in vertical position and adapted to have a light-sensitive element secured thereto, horizontal guiding means mounted in fixed position immediately adjacent the bottom of said base board, a vertical frame slidable on said fixed guiding means, said vertical frame facing said light-sensitive element and being movable toward and from the same, a vacuum frame carried by said vertical frame, means for moving said vacuum frame into engagement with said element, and vacuum-producing means cooperative with said vacuum frame.

9. In a photo-composing machine, a base board immovably fixed in vertical position and adapted to have a light-sensitive element secured thereto, horizontal guiding means mounted in fixed position immediately adjacent the bottom of said base board, a vertical frame slidable on said fixed guiding means and having its weight taken substantially solely thereby, said vertical frame facing said light-sensitive element and being movable toward and from the same, a vacuum frame carried by said vertical frame, means for moving said vacuum frame into engagement with said element, and vacuum-producing means cooperative with said vacuum frame.

10. In a photo-composing machine, a base board immovably fixed in vertical position and adapted to have a light-sensitive element secured thereto, horizontal guiding means mounted in a fixed position, a vertical frame disposed closely adjacent said light-sensitive element, said vertical frame having substantially its entire weight taken by said fixed guiding means and being supported at one end only thereby, and a vacuum frame carried by said vertical frame.

11. In a photo-composing machine, a base board immovably fixed in vertical position and adapted to have a light-sensitive element secured thereto, horizontal guiding means mounted in a fixed position, a vertical frame disposed closely adjacent said light-sensitive element and being supported by said fixed guiding means, said vertical frame being pivoted for movement toward and from said element, and a vacuum frame carried by said vertical frame.

12. In a photo-composing machine, a base board immovably fixed in vertical position and adapted to have a light-sensitive element secured thereto, horizontal guiding means mounted in a fixed position, a vertical frame disposed closely adjacent said light-sensitive element and being supported by said fixed guiding means, said vertical frame being pivoted for movement toward and from said element, a vacuum frame carried by said vertical frame, means for moving said vertical frame in a horizontal direction along said fixed guiding means, and means for moving said vacuum frame in a vertical direction with respect to said vertical frame.

13. In a photo-composing machine, a base board immovably fixed in vertical position and adapted to have a light-sensitive element secured thereto, horizontal guiding means mounted in a fixed position, a vertical frame disposed closely adjacent said light-sensitive element and being supported by said fixed guiding means, said vertical frame being pivoted for movement toward and from said element, a vacuum frame carried by said vertical frame, means for moving said vertical frame in a horizontal direction along said fixed guiding means, means for moving said vacuum frame in a vertical direction with respect to said vertical frame, a negative bearing plate in said vacuum frame, means for moving said negative bearing plate into sealed engagement with said light-sensitive element, and means for exhausting the air from the space between said plate and element.

14. In a photo-composing machine, a vertical frame, a vertical base board on said frame and adapted to have a light-sensitive element secured thereto, horizontal guiding means immovably fixed to said frame and positioned entirely at one side of the horizontal center line of said base board, a vertical frame having its weight taken substantially solely by said guiding means, and a vacuum frame carried by said last named vertical frame.

15. In a photo-composing machine, a vertical frame, a vertical base board on said frame and adapted to have a light-sensitive element secured thereto, horizontal guiding means immovably fixed to said frame and positioned below the center line of said base board, a vertical frame having its weight taken substantially solely by said guiding means, means for moving said vertical frame in a horizontal direction, a vacuum frame carried by said last named vertical frame, means for adjusting said vacuum frame in a vertical direction toward and from said fixed guiding means, and means for moving said vacuum frame toward said light-sensitive element.

16. In a photo-composing machine, a vertical frame, a vertical base board on said frame and adapted to have a light-sensitive element secured thereto, horizontal guiding means immovably fixed to said frame and positioned below the center line of said base board, a vertical frame having its weight taken substantially solely by said guiding means, said last named vertical frame being pivoted on a horizontal axis for movement toward and from said last named vertical frame, means for moving said vertical frame in a horizontal direction, a vacuum frame carried by said last named vertical frame, means for adjusting said vacuum frame in a vertical direction toward and from said fixed guiding means, and means for moving said vacuum frame toward said light-sensitive element.

ALEXANDER T. KOPPE.